Patented Apr. 28, 1953

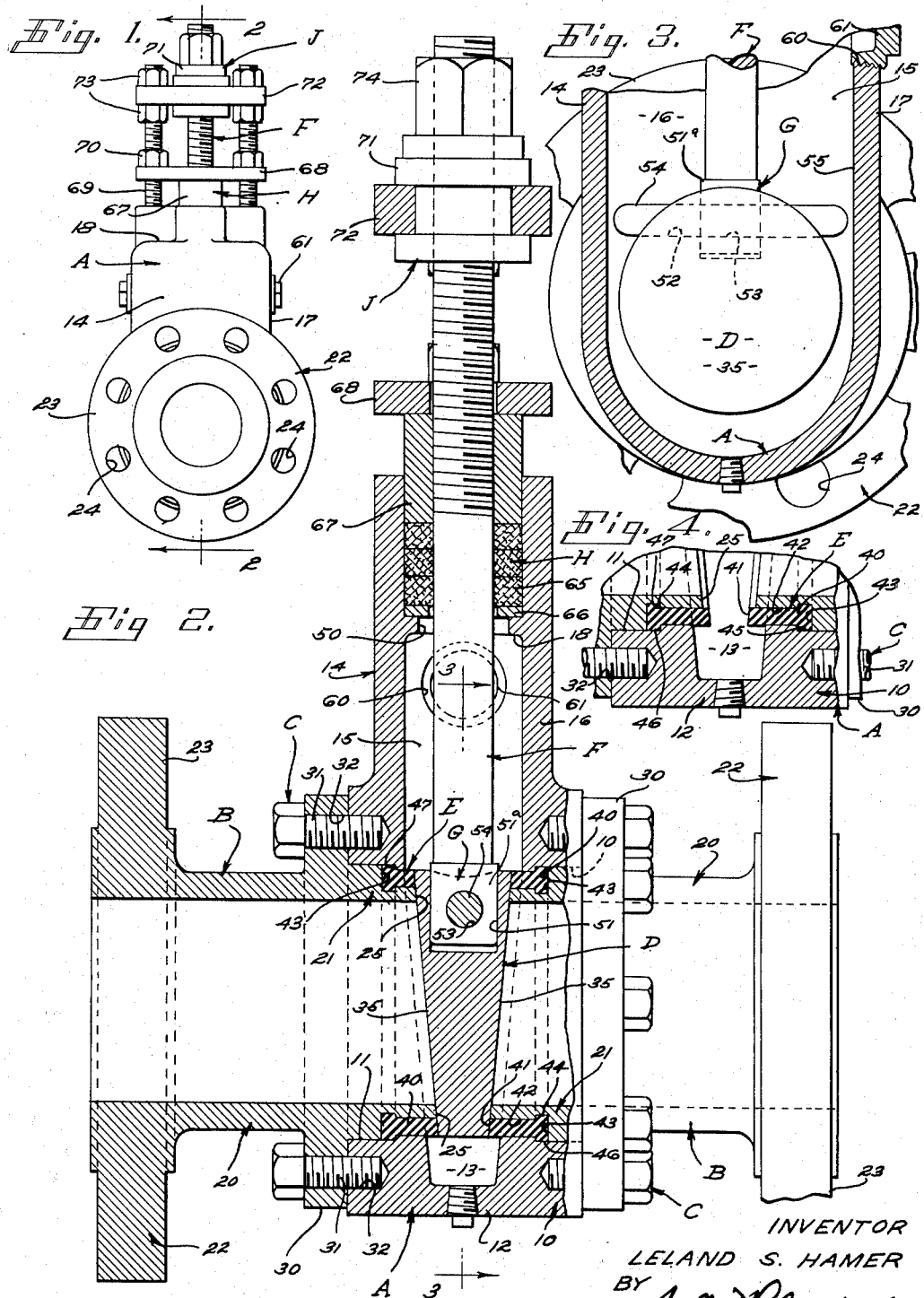

2,636,713

UNITED STATES PATENT OFFICE 2,636,713

GATE VALVE

Leland S. Hamer, Long Beach, Calif.

Application March 1, 1948, Serial No. 12,459

8 Claims. (Cl. 251—61)

This invention has to do with a gate valve and it is a general object of the present invention to provide a simple, practical improved gate valve.

It is a general object of the present invention to provide a gate valve wherein there is a body with aligned end openings normally closed by seat members and wherein the valve proper, operating within the body, is removable therefrom through the end openings when the seat members are removed.

Another object of the present invention is to provide a valve of the general character referred to wherein the seat members are on end sections releasably joined or connected with the body and involving parts by which the valve may be connected with pipes, or the like.

Another object of the present invention is to provide a valve construction of the general character referred to involving simple yet highly effective sealing rings on the seat parts with which the valve cooperates. With the construction provided by the present invention there are sealing rings carried on and by the seat parts to have exposed sealing portions at the interior of the body when the seat parts are in operating position.

Another object of the present invention is to provide a valve construction of the general character referred to wherein the valve proper is a simple, tapered disc and is joined to an operating stem by a simple, dependable releasable connection making it simple and convenient to release the valve from the stem when it is desired to remove it from the body.

It is a further object of this invention to provide a valve of the general character referred to wherein the body has a lateral extension, preferably integral therewith, and provided with an opening passing the stem and with a side access opening which is normally closed and through which the coupling pin between the stem and valve can be reached to release or disengage it.

The various objects and features of my invention will be fully understood from the following detailed description of a typical preferred form and application of my invention, throughout which description reference is made to the accompanying drawings, in which:

Fig. 1 is an end view of a valve embodying the present invention. Fig. 2 is an enlarged longitudinal sectional view of the valve, being a view taken as indicated by line 2—2 on Fig. 1. Fig. 3 is a transverse sectional view of a portion of the structure shown in Fig. 2, being a view taken as indicated by line 3—3 on Fig. 2 and Fig. 4 is a view of a portion of the structure shown in Fig. 2 with the valve removed from the seat parts.

The structure involving the present invention involves, generally, a central body A, outer or end sections B, means C connecting the end sections to the body, a valve D operable in the body, sealing means E engageable with the valve and sealing therewith when the valve is closed, an operating stem F for the valve, releasable coupling means G connecting the stem and the valve, packing means H around the stem and operating means J for the stem.

The body A is characterized by end portions 10 having aligned openings 11 and joined by a central portion 12 to define a valve chamber 13. A lateral extension 14 extends or projects from the structure formed by the ends 10 and part 12 which extension defines a valve chest 15. The extension 14 is formed by ends 16 and sides 17 and its outer or top end is closed by a top 18. The body structure thus far described is preferably an integral unit or cast structure and in accordance with my present invention it is unnecessary that the body involve separable sections or parts in order to facilitate insertion of the valve into the body.

The outer or end sections B of the structure are preferably so formed and constructed as to be alike, although in order to facilitate insertion of the valve into the body it is merely necessary that one end section be constructed as I am about to describe.

In the drawings the end sections B are shown as alike and each includes a middle or neck portion 20 which is tubular, a seat portion 21 at the inner end of the neck portion 20, and coupling means 22 at the outer end of the neck by which the valve may be joined to a pipe, or the like. The particular coupling means 22 shown in the drawings involves a flange 23 with a plurality of openings 24 to receive coupling bolts, or the like.

The seat portion at the inner end of the section B enters or extends into the opening 11 in an end 10 of the body A and is preferably of such extent that its inner end projects somewhat from the end 10 into the chamber 13 of body A. It is preferred that the inner end of the seat portion 21 be flat and smooth or otherwise finished to present a seat face 25 for the reception of or to be engaged by the valve D. In the preferred form of the invention the several parts or portions of the section B just referred to, that is, the neck 20, flange 23 and seat portion 21, are integrally joined or formed as a unit separable from the body A.

The means C connecting each end section B with the body A is a releasable fastening means and, in practice, preferably involves a screw fastener of suitable form. The particular fastening means illustrated in the drawings involves a flange 30 on the exterior of section B where the neck portion 20 joins the seat portion 21 and a plurality of screws 31 engaged through the flange 30 and threaded into sockets or openings 32 provided in end 10 of body A.

The valve D is preferably a simple round or disc-shaped element slightly smaller in diameter than the openings 11 provided in the ends 10 of body A, so that it can be inserted through an end opening 11 when such opening is clear or unoccupied. In the preferred construction the valve D is tapered or wedge shaped so that its two sides 35 converge from the upper end of the valve where it connects with the stem toward the lower end of the valve which approaches the bottom of the body when the valve is closed. In the particular valve illustrated the two sides 35 are finished so that they are flat and smooth and their peripheral portions are such as to engage or seat on the faces 25 of the seat portions 21 of sections B. With the valve wedge-shaped or tapered as just described and as clearly shown in Fig. 2 of the drawings, the faces 25 of the seat portions 21 are formed so that they are in planes angularly related to a plane normal to the longitudinal axis of the opening through the valve so that they oppose each other and define a tapered or wedge-shaped seat construction into which the valve seats when closed.

In accordance with the present invention there is a unit of the sealing means E at each seat portion 21. Each unit of the sealing means, as provided by the present invention involves, generally, an annular body or ring 40 of rubber or rubber-like material so shaped and mounted as to have a sealing face 41 at or adjacent the seat face 25 to make sealing contact with the valve when the valve is closed. In the preferred construction, as shown in the drawings, the inner end portion 42 of the seat portion 21 is turned down or is of reduced diameter and the sealing ring 40 surrounds said reduced part. The ring is proportioned so that it is held axially by a shoulder 43 formed by the reduced part 42. An inwardly projecting radial flange 44 on the ring seats or engages in an undercut portion 45 of reduced part 42 and an outwardly projecting radial flange 46 on the ring engages behind a shoulder 47 in the body opening 11. The flanges 44 and 46 secure or anchor the sealing ring 40 in place between the body and seat portion 21. In practice the seat ring is shaped and proportioned so that its end provided with the sealing face 41 is normally somewhat beyond or inward of the seat face 25, with the result that the sealing ring is compressed somewhat when the valve is moved to the closed position, bringing it into engagement with the face 25.

The stem F is provided as a means for operating the valve D and enters the top 13 of the body extension 14 through a stem opening 50.

The inner end of the stem F, that is, the end of the stem occurring within the body A, is releasably coupled or connected with the valve D by the means G. In accordance with my invention a socket 51 enters the valve D from its edge or periphery and at the thick portion thereof, and a head 51ª is provided on the inner end of the stem F to enter the socket 51. A transverse opening 52 is provided in the valve normal to the socket 51 and intersecting the socket 51. A corresponding or registering opening 53 is provided in the head 51 of the stem. A coupling pin 54 slidably extends through the openings 52 and 53 and thus serves to releasably couple the stem and valve together.

In accordance with the present invention the inner walls 55 of the sides 17 of extension 14 are parallel and smooth and the coupling pin 54 is of such length that its ends, which are preferably rounded as shown in Fig. 3, closely approach the walls 55 so that these walls serve to prevent movement of the pin from the openings 52 and 53.

Access openings 60 are provided in the sides 17 at opposite points, the openings 60 being normally closed by removable plugs 61.

To couple the valve with the stem the stem is located with its opening 53 in line with the access openings 60 and after the valve has been introduced through one of the body openings 11 it is moved into the valve chest 15 so that the head 51ª enters the socket 51 to bring the opening 52 into register with the opening 53. The pin 54 may then be inserted through one of the access openings 60 so that it passes into position in the openings 52 and 53 where it couples the valve to the stem. The said access opening is then closed by means of plug 61. With the pin 52 thus applied and confined between the walls 55 the valve is effectively coupled to the stem so that it moves in the valve chest 15 and chamber 13 as the stem is moved vertically. To remove the valve the operation just described may be reversed except that it is ordinarily desirable to remove both plugs 61 so that the pin 54 can be engaged at one end and forced or driven out through the access opening at the other end.

The packing means H provided for the stem F is preferably carried by the extension 14 of the body. In the construction illustrated the packing means is shown as including a body of packing 65 supported by a seat 66 in the stem opening 50 and engaged by a gland or follower 67. The follower 67 has a flange-like head 68 engaged on vertical parallel threaded posts 69 and nuts 70 are threaded on the posts 69 so that they can be operated to force the follower 67 against the packing 65.

The operating means J provided for operating the stem to move the valve D in or between the chamber and chest is shown as including a rotatable nut 71 threaded on the upper end portion or stem F and held by a carrier 72 secured on the upper ends of the posts 69 by the nuts 73. The nut 71 has a polygonal head 74 engageable by a wrench or operating tool. When the nut 71 is rotated the stem F is moved longitudinally either downwardly in the body or upwardly, depending upon the direction of rotation of the nut.

From the foregoing description it will be apparent that I have provided a gate valve wherein the body A is of simple, inexpensive construction while the end sections B serve to establish seats in the body to receive the valve and also carry the coupling parts by which the structure may be joined to a pipe, or the like. Further, it will be apparent that the sealing rings constructed and arranged as hereinabove described are simple parts that are effectively held through the cooperative action of the end sections and body and they pass sealing parts that are effective in engaging and sealing with the valve. The valve being releasably coupled to the stem through the simple construction above described can be easily applied to and removed from the stem whenever desired and can be arranged in and removed from the body whenever either one of the end sections is detached therefrom.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. A gate valve including a body section with a valve chamber and having an end with an opening communicating with the chamber and having a lateral extension with a valve receiving chest communicating with the chamber, an end section joined to the body with a seat portion entering said opening with clearance and terminating in a stationary rigid valve seat and provided at its outer end with coupling means, said seat portion cooperating with the body to define an annular space open toward the valve, a sealing ring surrounding and carried on the seat portion and completely occupying said space and exposed at the chamber, and a valve operable between the chest and the chamber and simultaneously engageable with the seat portion and the sealing ring when in closed position, the valve being round and smaller in diameter than said end opening.

2. A gate valve including, a body section with spaced ends defining a valve chamber and having a lateral extension with a normally closed side opening defining a valve chest in communication with the chamber, there being like aligned openings in the ends, like end sections joined to the body section and having seat portions extending into the said openings, a valve in the body section simultaneously engageable with said seat portions, an operating means for the valve including a stem for the valve shifting axially to move the valve, and a releasable connection between the stem and valve, the valve being removable from the body through said aligned openings when said connection is released and the seat portions are removed from said openings, the stem and valve having registering openings when cooperatively engaged, the releasable connection including a releasable coupling pin directly accessible through the side opening in the extension of the body section and movable through the side opening into and out of position in said registering openings where it couples the stem and valve.

3. A gate valve including, a body section with spaced ends defining a valve chamber and having a lateral extension with a normally closed side opening and defining a valve chest in communication with the chamber, there being like aligned openings in the ends, like end sections joined to the body section and having seat portions extending into the said openings, a valve in the body section simultaneously engageable with said seat portions, an operating stem for the valve, and a releasable connection between the stem and valve, the valve being removable from the body through said aligned openings when said connection is released and the seat portions are removed from said openings, the releasable connection including a coupling pin releasable from the stem and from the valve movable through the side opening into and out of position coupling the stem and valve while the valve and stem are maintained stationary relative to each other, the valve being disc-shaped and having a circular periphery and being smaller in diameter than the said aligned openings.

4. A gate valve including, a body section with spaced ends defining a valve chamber and having a lateral extension defining a valve chest in communication with the chamber, there being like aligned round openings in the ends, like end sections joined to the body section and having seat portions extending into the said openings and having stationary rigid seats, sealing rings surrounding the said seat portions and having sealing faces located substantially in the planes of the seats, and a valve operable between the chest and chamber to simultaneously engage the seats of the seat portions and faces of the sealing rings, the valve being round and insertable into and removable from the body section through either of the openings when the seat portion normally located therein is removed therefrom.

5. A gate valve including, a body section with spaced ends defining a valve chamber and having a lateral extension defining a valve chest in communication with the chamber, there being aligned openings in the ends, end sections joined to the body section and having seat portions extending through the said openings with clearance and into the valve chest and having opposed inner ends in the valve chest, the end sections and ends of the body cooperating to define annular spaces open to the valve chamber around said seat portions, sealing rings carried by the said seat portions and fully occupying said spaces, and a valve operable between the chest and chamber to simultaneously engage the seat portions and the sealing rings, the valve being insertable into and removable from the body section through the openings when the seat portions are removed therefrom, the inner ends of the seat portions being angularly related and the valve being a tapered disc simultaneously engageable with said inner ends of the seat portions.

6. A gate valve including, a body section with spaced ends defining a valve chamber and having like aligned round openings and with a lateral extension defining a chest in communication with the chamber and having a stem opening in its outer end, a threaded member in fixed position beyond the outer end of the extension, a stem entering the extension through said stem opening and having threaded engagement with said threaded member, like end sections with seat portions entering said openings and having opposed inclined seats in the chamber, means releasably securing the end sections to the body, a tapered disc-shaped valve in the body section engageable with the seats, and a releasable connection between the stem and valve, the valve being round and smaller in diameter than the said openings.

7. A gate valve including, a body section with spaced ends defining a valve chamber and having aligned openings and with a lateral extension defining a chest in communication with the chamber, end sections with seat portions entering said openings and having opposed inclined seats in the chamber, means releasably joining the end sections to the body, a tapered round disc-shaped valve in the body section simultaneously engageable with the seats, means operating the valve including a stem entering the extension and a threaded member rotatably supported at the exterior of the body and engaging the stem to shift it axially, and a releasable connection between the stem and valve, the valve being smaller in diameter than the said openings, the valve and stem having openings registering when the stem and valve are engaged and said connection including a coupling pin separable from the valve and from the stem and operable through a normally closed access opening in said extension.

8. A gate valve including a body section with spaced ends defining a valve chamber and having aligned openings and with a lateral extension defining a chest in communication with the chamber, a stem entering the extension, end sections with seat portions entering said openings with clearance and having inclined seats in the chamber, the end sections and ends of the body cooperating to define annular spaces open to the chamber, sealing rings surrounding the said seat portions and fully occupying the said spaces, a tapered disc-shaped valve in the body section simultaneously engageable with the seats and sealing rings, and a releasable connection between the stem and valve, the valve being smaller in diameter than the said openings, the sealing rings having anchoring flanges holding them against displacement from operating position.

LELAND S. HAMER.

References Cited in the file of this patent

UNITED STATES PATENTS

| Number | Name | Date |
|---|---|---|
| 6,414 | Scowden | May 1, 1849 |
| 166,472 | Mallison | Aug. 10, 1875 |
| 197,994 | Burnett | Dec. 11, 1877 |
| 257,275 | Beaumont | May 2, 1882 |
| 293,329 | Jenkins | Feb. 12, 1884 |
| 660,356 | Baker | Oct. 23, 1900 |
| 783,953 | Henry | Feb. 28, 1905 |
| 1,675,986 | Mason | July 3, 1928 |
| 1,828,478 | Sparks | Oct. 20, 1931 |
| 2,059,111 | Joyce | Oct. 27, 1936 |
| 2,117,774 | Textor | May 17, 1938 |
| 2,203,989 | Hamer | June 11, 1940 |
| 2,316,933 | Chaplin | Apr. 20, 1943 |
| 2,401,123 | Volpin | May 28, 1946 |

FOREIGN PATENTS

| Number | Country | Date |
|---|---|---|
| 6,146 | Great Britain | 1888 |
| 599,767 | Germany | 1934 |